United States Patent
Widger et al.

(10) Patent No.: US 7,068,772 B1
(45) Date of Patent: Jun. 27, 2006

(54) ECONOMICAL CALL PROCESSING SYSTEM AND METHOD, SUCH AS FOR PROVIDING ONE-NUMBER TELECOMMUNICATION SERVICES

(75) Inventors: Ian Widger, Bellevue, WA (US); Jeremy M. Knight, Bellevue, WA (US); Frederick A. Epler, Whitefish, MT (US)

(73) Assignee: AccessLine Communications Corporation, Bellevue, WA (US)

( * ) Notice: Subject to any disclaimer, the term of this patent is extended or adjusted under 35 U.S.C. 154(b) by 0 days.

(21) Appl. No.: 10/911,213

(22) Filed: Aug. 3, 2004

Related U.S. Application Data

(63) Continuation of application No. 09/823,897, filed on Mar. 30, 2001, now abandoned.

(51) Int. Cl.
*H04M 1/64* (2006.01)
(52) U.S. Cl. ............ 379/222; 379/212.01; 379/221.01
(58) Field of Classification Search ............................... 379/211.01–211.05, 212.01, 213.01, 214.01, 379/219, 220, 221.01, 127.01, 114.14, 121.01, 379/222
See application file for complete search history.

(56) References Cited

U.S. PATENT DOCUMENTS

| | | | |
|---|---|---|---|
| 4,757,267 A | 7/1988 | Riskin | |
| 5,590,186 A | 12/1996 | Liao et al. | |
| 5,610,970 A | 3/1997 | Fuller et al. | |
| 5,673,299 A | 9/1997 | Fuller et al. | |
| 5,752,191 A | 5/1998 | Fuller et al. | |
| 5,963,625 A * | 10/1999 | Kawecki et al. | 379/127.01 |
| 5,987,100 A | 11/1999 | Fortman et al. | |
| 5,999,614 A * | 12/1999 | Doshi et al. | 379/219 |
| 6,240,173 B1 * | 5/2001 | Trumbo et al. | 379/219 |
| 6,359,978 B1 | 3/2002 | Brady | |
| 6,389,117 B1 | 5/2002 | Gross et al. | |
| 6,594,352 B1 | 7/2003 | Smith | |
| 6,681,008 B1 * | 1/2004 | Bolduc et al. | 379/222 |

OTHER PUBLICATIONS

U.S. Appl. No. 09/604,283, filed Jun. 26, 2000, Zhuk et al.
U.S. Appl. No. 60/223,160, filed Aug. 7, 2000, Widger et al.
U.S. Appl. No. 60/235,989, filed Sep. 28, 2000, Widger.

* cited by examiner

*Primary Examiner*—Fan Tsang
*Assistant Examiner*—Md Shafiul Alam Elahee
(74) *Attorney, Agent, or Firm*—Perkins Coie LLP

(57) ABSTRACT

A system and associated method receive, from a local telecommunications network, a call from a first number, to a second number associated with an individual or subscriber. The system and method locally store at least the second number, and initiate a dial-up call to a central telecommunication server or a dialed-up network via the local telecommunications network. The system and method then transfer at least the second number to the central telecommunications server via the dial-up call over the dial-up network. The dial-up network can be a 1-800 network, long distance network, or other network.

21 Claims, 8 Drawing Sheets

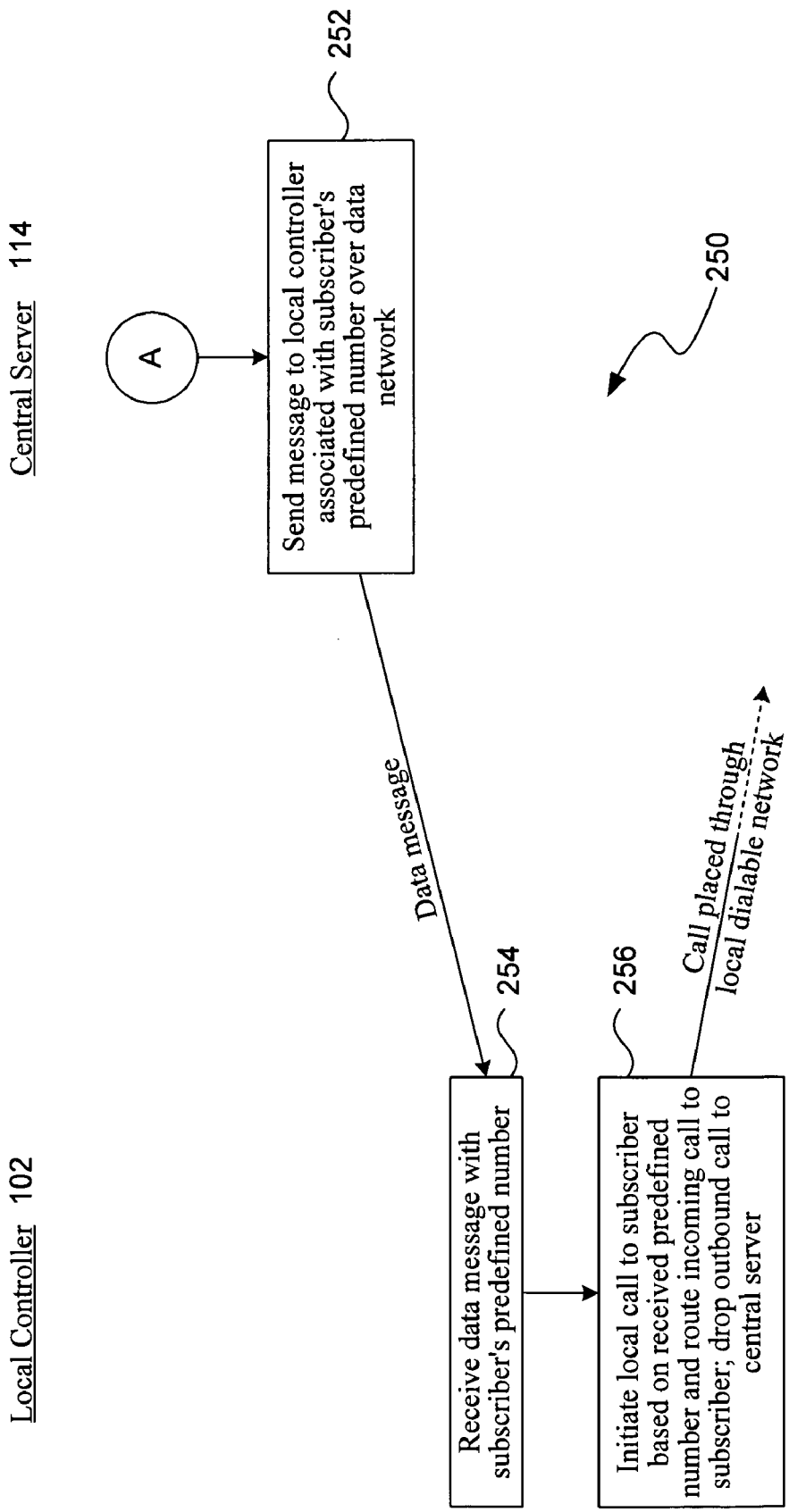

Local Denver Controller's 1-800 Number Record

| Seattle Central Server's 1-800 Number | 1-800-123-4567 | ~ 302 |
|---|---|---|
| NYC Central Server's 1-800 Number | 1-800-456-7890 | ~ 304 |
| Airline's Domestic Reservations 1-800 Number | 1-800-789-1111 | ~ 306 |
| Airline's International Reservations 1-800 Number | 1-800-789-2222 | ~ 308 |
| Airline's Customer Service 1-800 Number | 1-800-789-3333 | ~ 310 |
| Airline's Mileage Plan 1-800 Number | 1-800-789-4444 | ~ 312 |
| Airline's Air Freight 1-800 Number | 1-800-789-5555 | ~ 314 |
| Airline's Baggage Service 1-800 Number | 1-800-789-6666 | ~ 316 |
| Airline's 1-800 Number | 1-800-789-0000 | ~ 318 |

Local Denver Controller's Subscriber Record

| | | |
|---|---|---|
| Seattle Central Server's 1-800 Number | 1-800-123-4567 | 302 |
| NYC Central Server's 1-800 Number | 1-800-456-7890 | 304 |
| Seattle Central Server's Address | seattle@accessline.com | 502 |
| NYC Central Server's Address | nyc@accessline.com | 504 |
| Subscriber's Outgoing Voice Greeting | <.WAV file> | 506 |
| Subscriber's Primary Address | subscriber@acmeinc.com | 508 |
| Subscriber's Secondary Address | subscriber@ispinc.com | 510 |
| Subscriber's 1st Stored Voice Message | <.WAV file> | 512 |
| Subscriber's 2nd Stored Voice Message | <.WAV file> | 514 |
| Subscriber's 3rd Stored Voice Message | <.WAV file> | 516 |
| | | |
| | | |

ECONOMICAL CALL PROCESSING SYSTEM AND METHOD, SUCH AS FOR PROVIDING ONE-NUMBER TELECOMMUNICATION SERVICES

CROSS-REFERENCE TO RELATED APPLICATION(S)

This application is a continuation of U.S. patent application Ser. No. 09/823,897 filed Mar. 30, 2001 now abandoned, which application is incorporated herein by reference.

TECHNICAL FIELD

This disclosure relates to systems for providing telecommunication services, such as services over existing telephone networks.

BACKGROUND

Users wish to have a broad range of telecommunication services with which to communicate with others and to efficiently exchange information. One telecommunication service, commonly known as a "one-number service," assigns a single local telephone number to a user or subscriber. Others may communicate with the subscriber via land line telephones (such as a telephone at work and another at home), a cell phone, a one- or two-way pager, facsimile machine, and a host of other telecommunications services and devices by employing only the single number. A telecommunications server and switching system receives incoming calls to the subscriber's number, and based on the stored subscriber profile, determines how to treat the incoming call (such as forward the call to the user's cell phone, record a voice mail message, forward the call to the subscriber's secretary's telephone, etc.). Details regarding such one-number service may be found in, for example, U.S. Pat. No. 5,752,191, entitled "Telephone Control System Which Connects a Caller With a Subscriber at a Telephone Address," U.S. Pat. No. 5,610,970, entitled "Telephone System With Scheduled Handling of Calls," and U.S. Pat. No. 5,673,299, entitled "Adjunct Controller for a Telephone System".

Such one-number services employ systems that are either centralized or distributed. With distributed systems, a separate telecommunications server is located in each local calling region in which the one-number service is to be provided. Unfortunately, such telecommunications servers are expensive. As a result, many one-number service providers employ centralized systems having one or more central telecommunications servers, and all incoming calls are forwarded to this central server. To provide subscribers with local telephone numbers in each region in which the one-number service is to be provided, separate channel service units ("CSU") are located in each of such regions. Each regional CSU typically receives as input several T-1 lines to handle current and future estimated subscribers for the region. Each T-1 line may be associated with typically 500 to 1,000 local telephone numbers sold to subscribers by the service provider under the one-number service. Each CSU is then connected to a peer CSU co-located with the central server over one or more T-3 trunks or similar links. Each regional-central CSU pair includes a cross-connect switching function (among other circuitry) to route incoming calls from the T-1 lines to the central server over the leased T-3 trunk.

In operation, a caller places a call to a subscriber's one-number where, in this example, the subscriber and caller are located in a local region distant from the central server. The caller's call is routed by the regional phone company to the CSU in the region, which transparently routes the call over the T-3 trunk via the central CSU to the central server. The central server, in turn, determines the location of the subscriber, and places a long distance call to the subscriber in the subscriber's current region (the same region in this example), to thereby connect the call between the caller and the subscriber.

Unfortunately, the service provider must establish a CSU in every region in which the service provider wishes to provide service, and enter into service agreements with local exchange carriers ("LEC") to lease a desired number of T-1 lines for the anticipated number of subscribers that may request the one-number service. Furthermore, the service provider must also enter into a service agreement with a back-haul carrier (such as a long distance telecommunications provider like Sprint or AT&T) to lease one or more T-3 trunks that connect the CSU with the central server. The T-1 lines are expensive and the T-3 trunks considerably more so. Furthermore, calls over T-3 trunks are distance and volume sensitive, i.e., the back-haul or long distance carriers charge by the mile and by the bandwidth. Thus, the service provider must pay for each long distance call between the originating CSU and the central server, and for each long distance call between the central server and the subscriber, such as to the CSU in the subscriber's region. At times, the caller and subscriber may be in the same region, or in different regions within a single LEC or regional Bell operating company ("RBOC").

Another problem is that the service provider must provide redundancy in its network for fault tolerance and to ensure that continuous service is provided to each subscriber. Thus, the service provider may be required to establish more than one CSU within a region, more than one backhaul facility (T3 trunk for example) and/or call advance agreements with the local service providers. This duplicity of CSU pairs and of the leased capacity to interconnect them results in very high costs especially when a remote market is in an early stage of establishment and call volumes are relatively low. In the event of a failure of the CSU's in either the central or regional locations or of the leased capacity interconnecting them, call advance routing will require additional cost in central site ports and long distance charges. The call advance agreements require the regional phone company to advance calls to the central site using long distance call routing in the event that calls cannot be completed to the regional CSU T1 ports. If a failure occurs, some one-number services may not be provided because original dialed number ("ODN") and calling line identification ("CLI") information may not be successfully passed to the central server in a call advance routing scenario. In other words, the regional phone company drops the ODN and CLI, and thus, the central server does not know to which number the incoming call was placed, or which number the incoming call was from. Thus, callers may be required to reenter their phone number before the call is forwarded to the subscriber.

One method of solving some of the above problems is to create and employ a voice-over Internet protocol (IP) network. Voice-over IP networks may avoid the need to lease expensive T-3 trunks and pay long distance rates in order for calls to be routed by the service provider. Unfortunately, voice-over IP networks cannot use the Internet, but instead must employ a dedicated network, supporting the required protocols and quality of service ("QOS") controls, to provide reliable and acceptable service. As result, a premium price must be paid to implement voice-over IP to get from one gateway to another. The network must be defined and implemented before providing services to subscribers. Again, the service provider must forecast the number of subscribers to be managed within a region, and must build a network to achieve the future anticipated capacity.

BRIEF DESCRIPTION OF THE DRAWINGS

FIG. 2C is a flow diagram that illustrates (together with FIG. 2A) an alternative method for providing telecommunication services to that of FIGS. 2A and 2B.

FIG. 3 is a data structure diagram illustrating a record for storing 1-800 numbers for the system in FIG. 1.

FIG. 5 is a data structure diagram illustrating a subscriber record for use with the network of FIG. 4.

Figure 1:
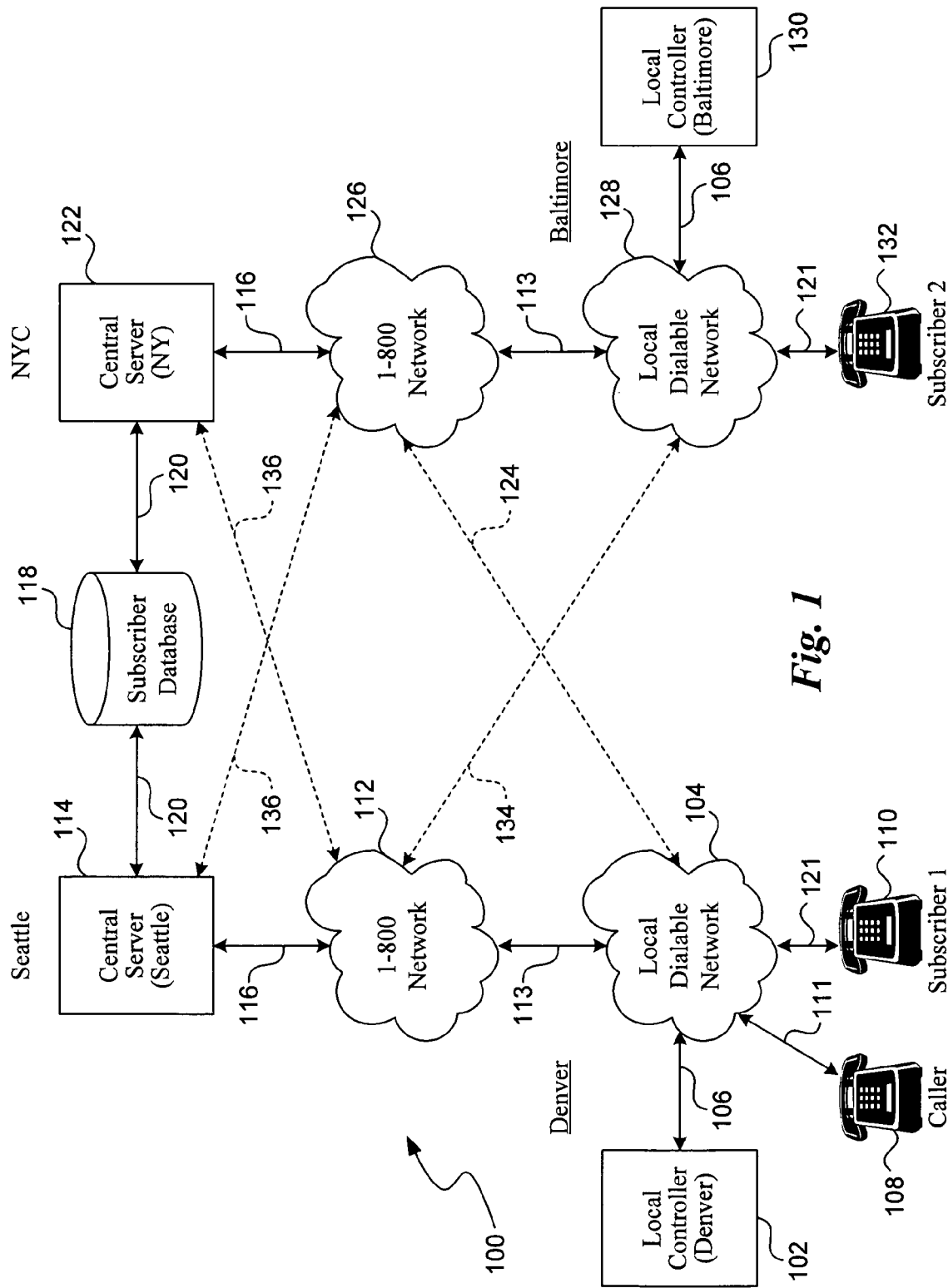
FIG. 1 is a network diagram illustrating an example of a system under one embodiment of the inventive system.

In the drawings, the same reference numbers identify identical or substantially similar elements or steps. To easily identify the discussion of any particular element or step, the most significant digit or digits in a reference number refer to the Figure number in which that element is first introduced (e.g., block 103 is first introduced and discussed with respect to FIG. 1).

The headings provided herein are for convenience only and do not necessarily affect the scope or meaning of the claimed invention.

DETAILED DESCRIPTION OF THE ILLUSTRATED EMBODIMENTS

A call processing system, and in particular, a method and apparatus for call routing using inexpensive, per call metered networks, is described in detail herein. In the following description, numerous specific details are provided, such as specific steps, ordering of steps, types of networks, telecommunications equipment, and the like, to provide a thorough understanding of, and enabling description for, embodiments of the invention. One skilled in the relevant art, however, will recognize that the invention can be practiced without one or more of the specific details, or with other steps, ordering of steps, networks, equipment and the like. In other instances, well-known structures or operations are not shown, or not described in detail, to avoid obscuring aspects of the invention.

Referring to FIG. 1, an example of a network 100 under one aspect of the invention employs a local computer or controller 102, which is shown in FIG. 1 as being positioned in Denver. The local Denver controller communicates with a local dialable network 104 over one or more T-1 spans 106. In the following example, a caller 108 in the Denver region places a call to a subscriber 110 also currently located in Denver. The caller places a call to the subscriber over a telecommunications line 111, where the telecommunications line 111 may be any wired or wireless link between a phone the caller operates and the local dialable network 104, although any telecommunications network may be employed (such as other portions of the public switched telephone network ("PSTN"), cellular networks, etc.). The local dialable network, in turn, routes the call to the local Denver controller over T-1 span 106. In response to this incoming call, the local Denver controller stores the caller's dialed-in digits, in this case the subscriber's phone number, and the calling line identification ("CLI") information, including the phone number of the phone the caller is using. Of course, other information may be routed to and stored at the local controller. The local Denver controller 102 may be, for example, a server or mini computer provided by Sun Microsystems, such as the Sun Netra computer. The controller 102 includes one more telecommunications cards, such as computer telephony cards manufactured by Dialogic. Information on such cards may be found at http://www.dialogic.com. Each Dialogic card may accept, for example, four T-1 spans. The local controller includes simple software routines to route incoming calls on T-1 spans to available outbound lines as 1-800 calls, and may include routines to receive incoming calls, process them and initiate corresponding outgoing calls, as described below. Note that in an alternate embodiment, the controller 102 may be, for example, a switching system and associated control computer, such as the Lucent EXS switch, which may include one or more T1 span cards and one or more embedded CPU cards. Information on this equipment may be found at http://www.lucent-ssq.com/ons/exs/. Note also that in another alternate embodiment (described below), the incoming calls may be routed to available outbound lines (other than as 1-800 calls), for example as calls to standard PSTN numbers.

After storing the dialed-in digits and CLI, or concurrently therewith, the local Denver controller 102 places an outgoing 1-800 call over a 1-800 network 112 via an appropriate link 113 between the local dialable network 104 and the 1-800 network (e.g., an ISDN or SS7 link). The 1-800 network 112 in turn routes the call to a central server 114, shown in FIG. 1 as being located in Seattle, over a link 116 provided by an LEC (or similar service provider), or alternatively by the 1-800 carrier directly. The link 116 may be provided free of charge by the LEC or carrier. The central server 114 may include a switching system and associated control computer, such as the Lucent EXS switch, which may consist of one or more T1 spans cards and one or more embedded CPU cards. The central server 114 may also include one or more integrated voice response (IVR) peripherals, consisting of a computer and associated IVR cards such as the Dialogic D480SC2T1 card. More information on these cards can be found at www.dialogic.com. The IVR peripheral serves to interact with the caller, for example by playing greetings and voice prompts, detecting DTMF or other input from the caller, and recording messages from the caller.

The 1-800 network 112 may be any inward wide area telephone service (IN-WATS) also known as a toll free service. The 1-800 network employs ten digit telephone numbers having as their "area codes" the numbers 800, 888, 877, and the like. Internationally, 1-800 services are also known as "FreeFone Services" or "GreenFone Services," and dialing schemes may vary, such as being based on the prefix 0-800 or 0-500. Indeed, aspects of the invention may be employed internationally under such numbers, and under any Universal International FreeFone Number ("UIFN") numbers, such as those under International Telecommunications Union ("ITU") standard ITU-T E.169. The term "1-800 network" is used generically herein to refer to any of the above types of networks and calling systems described herein.

Dialing a 1-800 number is free to the person making the call, but the call is billed to the company being called, in this case, the service provider. Calls under 1-800 networks may be billed in a variety of ways. However, 1-800 calls may be considerably less expensive than normal long distance calls. 1-800 networks are national and distance independent. Prices are competitive among long distance carriers, and thus price-per-minute charges for 1-800 calls may be substantially less than those for typical long distance calls (which are not priced independent of distance). Furthermore, many local telecommunications service providers employ local metered market rates for local calls. By employing 1-800 calls with the 1-800 networks, the service provider need not pay local metered market rates. Thus, 1-800 rates are likely cheaper than local calls in many markets.

Furthermore, 1-800 numbers are portable. In other words, the owner of a 1-800 number may change between long distance carriers or interexchange carriers ("IXCs") (e.g. to pursue the best rate offered by a given IXC). Of course, other telecommunications service providers may provide 1-800 networks and associated services, including any Bell operating companies' IN-WATS service, in addition to known IXCs, such as AT&T, MCI, Sprint, etc. A 1-800 service is effectively a database look-up and translation service for incoming phone calls, and thus, 1-800 service may be employed in a variety of ways, as described herein. A centralized database (not shown in FIG. 1) identifies the LEC or IXC that provides the 1-800 number, and translates the 1-800 number into a "real" telephone number. Based on that information, the LEC switch or other network routes the call to the proper IXC (such as between the local dialable network 104 and the 1-800 network 112). Once the 1-800 network receives the call, it may send the call to the Seattle central server 114 in a variety of ways, known by those skilled in the relevant art. Regardless of the type of routing, the 1-800 call placed by the local Denver controller 102 is routed to the Seattle central server 114 by employing a single, inexpensive 1-800 call made to the 1-800 number associated with the Seattle central server.

Thus, the local Denver controller 102 may establish an inexpensive telecommunications link with the Seattle central server by employing the associated 1-800 number. During or after establishing the 1-800 call, the local Denver controller provides the Seattle central server detailed signaling information associated with incoming call, including the ODN and CLI, and routes the incoming call to the Seattle central server, where the CLI information is inserted in the CLI field of the ISDN frame, and the dialed-innumber, or ODN, (the subscriber number) is inserted within an available field in the ISDN—call setup message on the D-channel, for example as additional digits within the CLI field. Alternatively the dialed-in number and the CLI number may be sent as a data message via a separate data network, and this data network may be used to allow the central server to acknowledge the receipt of the message, or request a retry.

Effectively, by relaying the incoming call as a 1-800 call, the original dialing number is not lost, but instead is passed reliably by the local controller to the central server using an available field in the call setup message. In addition to the available field, or in lieu thereof, any other fields may be used, such as the extended destination field, or any other unused fields defined by the ISDN protocol (or Signaling System 7 ("SS7") protocol). If all fields are employed, or a call or network is used that lacks usable fields, then the original dialing number may be transferred to the central server as dual-tone multi-frequency ("DTMF") tones or by other in-band or out-of-band telecommunications signaling methods. Furthermore, ISDN service need not be employed, but any other frame relay, packet switch, or call routing protocol may be employed whereby both dialed-in digits and CLI information are routed to the central server.

In one embodiment, during the 1-800 call setup and signaling process described above, if the process of passing the ODN and CLI information takes long enough to be noticed by the caller, for example in the case of using in-band DTMF tones, then the local controller may play a "ring tone" or other "confidence" tones or prompts to the caller. Once the signaling is complete, the local controller will bridge the inbound call to the 1-800 call, and therefore through to the central server. This bridging action may be performed with the local controllers simply by connecting the two call legs together within the local controllers switching function, or alternatively may be performed by using "release link", "call transfer", or similar features of the local dialable network, under direction of the local controller. Release link and call transfer features are well known to one skilled in the art.

Upon receiving an incoming call, the Seattle central server 114 determines if the CLI and dialed-in number of the original call are provided. If these numbers are provided, then the Seattle central server 114 will send a short positive acknowledgment message back to the local controller 106 (for example via a DTMF digit "1"), causing the local controller to connect the audio path between the incoming call and the outgoing call. If for some reason, the CLI and dialed-in numbers are not both provided (for example, because of a failure of the network to deliver this information), the Seattle central server 114 will send a short negative acknowledgement message back to the local controller 106 (for example via a DTMF digit "2"), causing the local controller to transmit the CLI and dialed-in number via in-band signaling (DTMF or MF). Upon receipt of the in-band digits, the Seattle central server 114 will send the short positive acknowledgment message back to the local controller (for example via a DTMF digit "1"), causing the local controller to connect the audio path between the incoming call from the caller 108 and the outgoing 1-800 call.

The Seattle central server 114 retrieves from a subscriber database 118 over a telecommunications link 120 an appropriate subscriber profile based on the dialed-in digits. The telecommunications link 120 may be any known wired or wireless link coupling the Seattle central server with the subscriber database. Rather than being a remote database, the subscriber database may be integrated or implemented with the Seattle central server.

Unless described otherwise herein, the construction and operation of the various blocks shown in FIG. 1 are generally of conventional design. As a result, such blocks need not be described in further detail herein because they will be understood by those skilled in the relevant art. Such further detail is omitted for brevity and so as not to obscure the detailed description of the invention. Any modifications necessary to the blocks in FIG. 1 (or other embodiments) can be readily made by one skilled in the relevant art based on the detailed description provided herein.

Although not required, aspects of the invention will be described herein in the general context of computer-executable instructions, such as routines executed by a general-purpose computer (e.g., a server or personal computer having telecommunications capabilities). Those skilled in the relevant art will appreciate that aspects of the invention can be practiced with other computer or telecommunications system configurations, including Internet appliances, handheld devices, wearable computers, cellular or mobile phones, multi-processor systems, microprocessor-based or programmable consumer electronics, set-top boxes (such as for use with cable TV), network PCs, mini-computers, mainframe computers, and the like. The invention can be embodied in a special purpose computer or data processor specifically programmed, configured or constructed to perform one or more of the computer-executable instructions explained in detail herein. Indeed, the term "computer," as generally used herein, refers to any of the above devices, as well as any data processor.

While not shown, the computers described herein, including the controller 102 and central server 114, include one or more central processing units or other logical processing circuitry and memory, and may include certain input devices (e.g., keyboards and pointing devices), output devices (e.g., display devices or printers), and storage devices (e.g., fixed and floppy magnetic disk drives, optical disk drives and card readers), all well known, but not shown. While shown as separate components, databases, such as the database 118, may form part of or be integral to a computer with which it communicates. The computers may include other program modules not described herein, such as an operating system, one or more application programs (e.g., database or spreadsheet applications), a web browser or server, and the like.

Aspects of the invention can also be practiced in distributed computing environments where tasks or modules are performed by remote processing devices, and which are linked through a communications network such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on computer-readable media, including magnetic and optically readable and removable computer disks, hard-wired or pre-programmed in chips (e.g., EEPROM semiconductor chips), as well as distributed electronically over the Internet or via other networks (including wireless networks). Processes or software components under aspects of the invention may be created under various ways, such as through source code programming, created as microcode or programmed logic arrays, or the like. Those skilled in the relevant art will recognize that portions of the invention reside on a server computer, while corresponding portions may reside on a client computer. Data structures and transmission of data particular to aspects of the invention are also encompassed within the scope of the invention. In general, while hardware platforms, such as the local controllers and central servers, are described herein, aspects of the invention are equally applicable to nodes on a network having corresponding resource locators to address and identify such nodes.

Figure 2A:
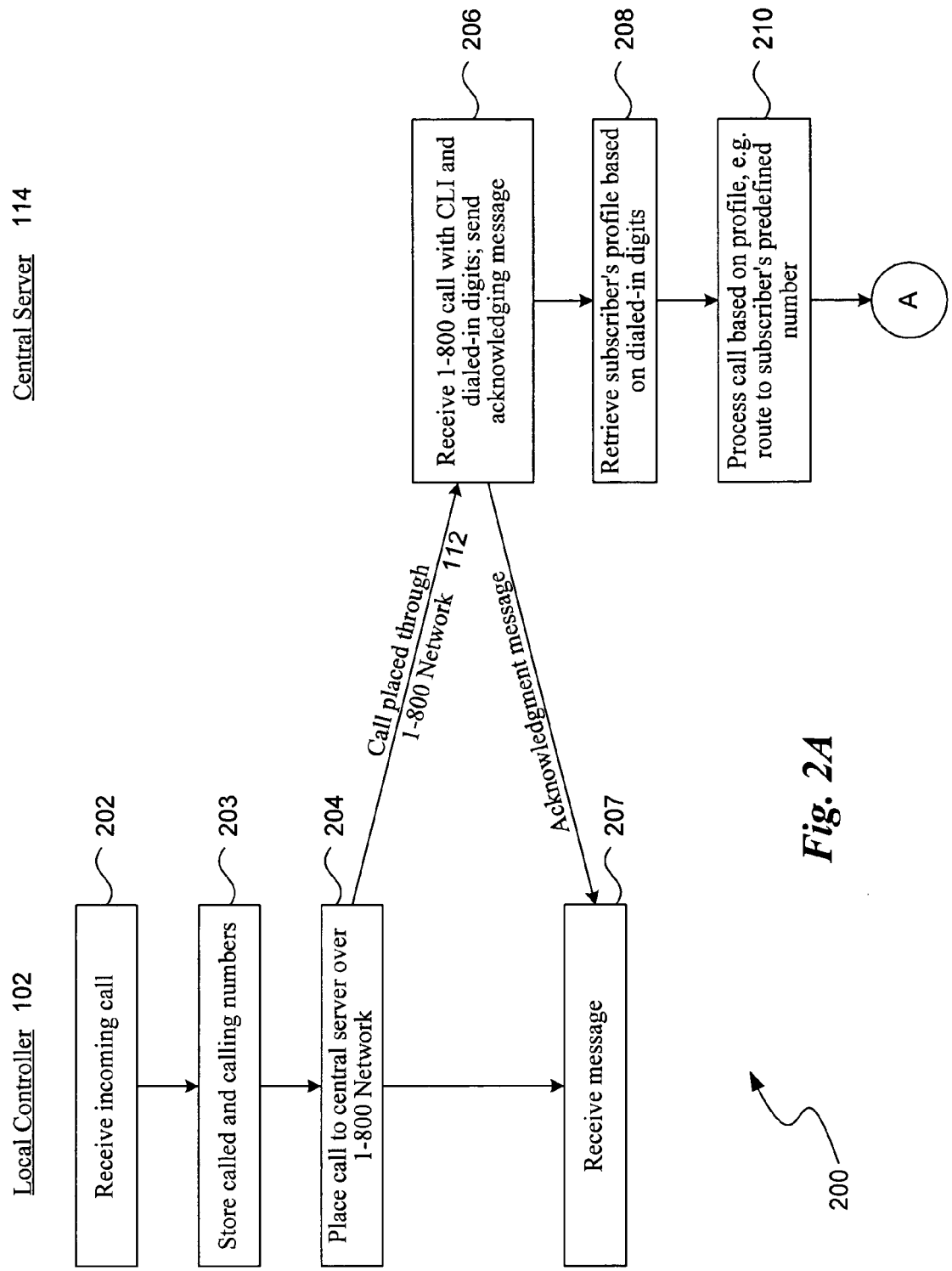
FIGS. 2A and 2B together are a flow diagram illustrating a method for providing telecommunications services, such as one-number services, under the system of FIG. 1.
Figure 2B:
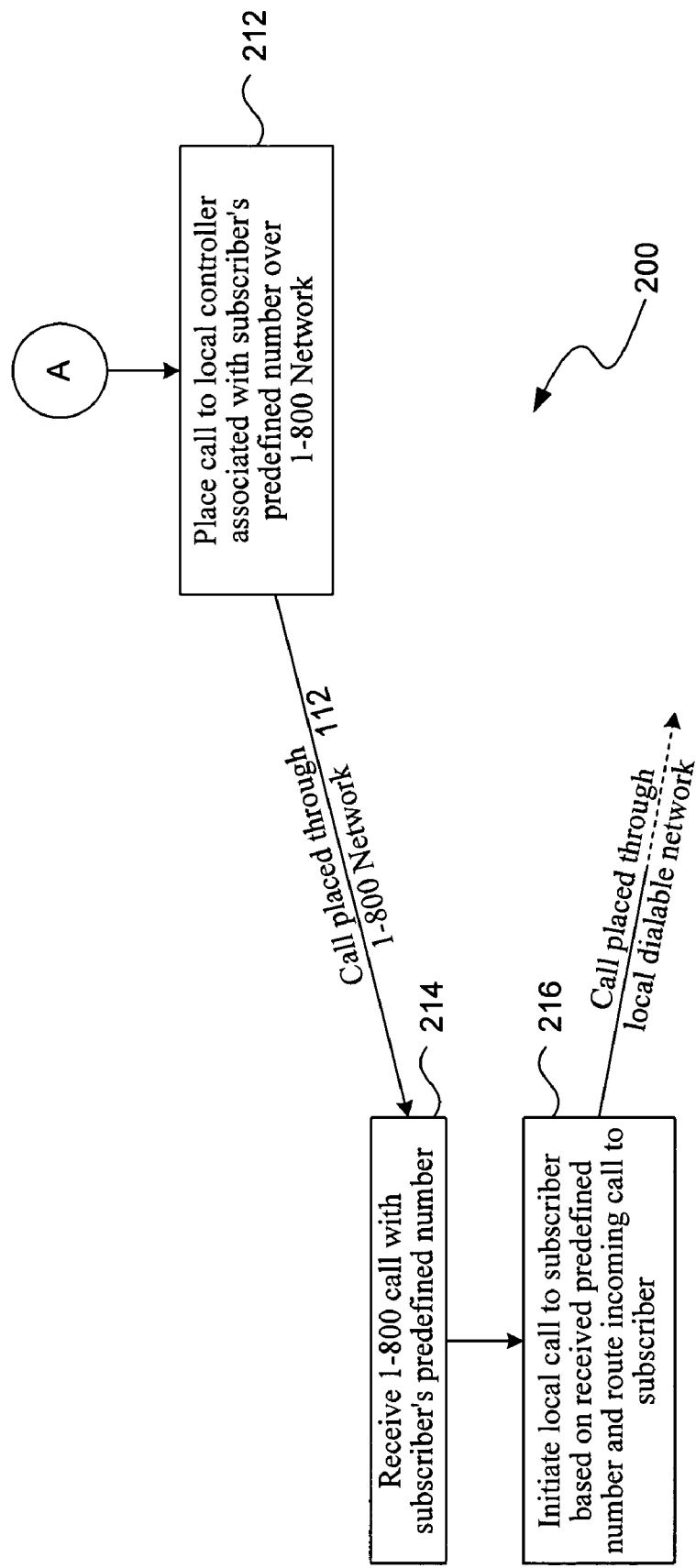

Referring to FIGS. 2A and 2B, a routine 200 is shown as a flow diagram that illustrates the functions performed by the local controller 102 and central server 114, and calls placed therebetween. The diagram of FIGS. 2A and 2B does not show all functions or exchanges of data, but instead, provides a conceptual understanding of functions and data exchanged under the system of FIG. 1. Of course, those skilled in the relevant art will recognize that some functions or exchange of commands and data may be repeated, such as when a call is routed to a subscriber and the subscriber routes the call back for additional processing. As shown in FIGS. 2A and 2B, functions performed by the local controller 102 are presented in a left-hand column, while steps performed by the central server 114 are shown in a right-hand column.

Referring to FIG. 2A, the local controller 102 receives an incoming call under block 202. In block 203, the local controller stores at least the dialed-in digits and/or the CLI (e.g., the called and calling numbers). In block 204, the local controller places a call to the central server 114 over the 1-800 network 112 and routes the call with the stored data.

In block 206, the central server 114 receives the 1-800 call, together with the CLI and dialed-in digits. If the central server correctly receives the CLI and dialed-in digits, then its sends an acknowledgment message to the local controller, such as a DTMF "1" over the 1-800 call, or as a short data message over a data network. In block 207, the local controller 102 receives the acknowledgment message and connects the audio path between the incoming call and the outgoing call.

In block 208, the central server retrieves the subscriber's profile in the subscriber database 118, based on the dialed-in digits.

In block 210, the central server 114 processes the call based on the retrieved profile. For example, the central server may connect the call to an integrated voice response resource to play a greeting and/or to interact with the caller via DTMF or speech recognition. The central server may then also, for example, route or initiate a call to a predefined number established by the subscriber in the subscriber's profile. The subscriber may have defined in his or her profile that calls placed to the subscriber's number between 8:00 and 12:00 Pacific Time are to be routed to a predefined and stored office telephone number. Therefore, the central server may then place a long distance call to the subscriber's stored office number and the routine 200 ends.

However, under an alternative embodiment shown in FIG. 2B, the central server 114 in block 212 determines the subscriber's location based on the stored profile to identify the local controller associated with the subscriber's location. The central server then places a 1-800 call to a 1-800 number associated with that local controller. In the example shown in FIG. 1, the subscriber (and the caller) are both located in the Denver local dialable network. Therefore, the central server initiates a 1-800 call to the local Denver controller 102 based on a stored 1-800 number associated with that controller. In block 214, the local Denver controller receives the 1-800 call from the central server. Stored in, for example, the user data field, is the subscriber's predefined number, which the local controller retrieves. In block 216, the local Denver controller then initiates a local call to the subscriber based on the received predefined number and routes the incoming call to the subscriber via the local dialable network 104. In this example, two 1-800 calls are made, which are less expensive than typical long distance calls.

Under this alternative embodiment, the system will often make two 1-800 calls when the subscriber and caller are associated with two different local controllers. However, in the above example, the central server may provide the subscriber's predefined number in a data message transmitted to the local Denver controller over the first 1-800 call made to the central server by the local Denver controller. Thus, the central server need not make a second 1-800 call when the subscriber is located in the same local dialable network as the caller. Those skilled in the relevant art will recognize that various other methods of routing calls may be employed.

For example, one alternative method of routing calls is shown in FIG. 2C as a routine 250. The routine 250 performs functions substantially similar to those of routine 200 under blocks 202 through 210. In block 252, the central server 114 determines that the subscriber's location based on the stored profile is a local call from the local controller associated with the subscriber's location. The central server then sends a data message over a separate data network to the original caller's local controller, instructing that local controller to connect the original incoming call to a predefined number associated with the subscriber's location, where this number is also included in the data message. In block 254, the local controller 102 receives the data message with the subscriber's predefined number. In block 256, the local controller initiates a local call to the subscriber based on the received predefined number and routes the incoming call to the subscriber via the local dialable network 104. The central server is then disconnected from the call, by releasing the outbound 1-800 call from the local controller to the central server.

In the system 100 of FIG. 1, a second central server 122 is employed, and shares the subscriber database 118. As shown, the second central server is located in New York City. The New York central server provides redundancy, load balancing, and other benefits. However, more than two central servers need not necessarily be employed by the service to provide such benefits, as those skilled in the relevant art will appreciate from the detailed description provided herein. For example, if the Seattle central server 114 fails, the local Denver controller may automatically route calls to the New York central server 122 over an alternate link 136. The local Denver controller simply places the 1-800 call to a 1-800 number associated with the New York central server. As shown in FIG. 1, a separate 1-800 network 126 may be employed to provide further fault tolerance if the first 1-800 network 112 should fail. For example, the first 1-800 network 112 may be operated by one IXC (such as AT&T), while the second 1-800 network 126 is operated by another IXC (such as MCI). As described below, employing a second 1-800 network 126 provides numerous additional benefits.

The New York central server 122 may exchange 1-800 calls through a Baltimore local dialable network 128 with a local Baltimore controller 130. The local Baltimore controller 130 may serve subscribers within the Baltimore local dialable network, such as calls to a second subscriber 132. The New York central server may communicate with the local Baltimore controller primarily by way of the second 1-800 network 126. If the second 1-800 network fails, the local Baltimore controller may route calls to the first 1-800 network 112 (over a link 134 shown in FIG. 1). Of course, the Seattle central server may make 1-800 calls to the second 1-800 network, and the New York central server make calls to the first 1-800 network, over links 136 shown in FIG. 1. For example, if the first subscriber 110 wished to place a call to the second subscriber 132, the Seattle central server may receive a first 1-800 call over the first 1-800 network 112 (placed by the local Denver controller), and in turn, make a call through the second 1-800 network 126 to the local Baltimore controller. The local Baltimore controller, in turn, may then make a local call to the second subscriber to thereby connect the call. Of course, each of such calls transfers all relevant information, such as the dialed-in-digits and CLI, where needed. Alternatively, the Seattle central server may instruct the local Denver controller to route the call directly to the Baltimore controller, dropping the connection to the Seattle central server after it had optionally performed any greeting, screening, or other functions available only on the central server. Many other methods of routing calls by using the 1-800 networks are possible.

While two local controllers are shown in FIG. 1, the service provider may locate local controllers in any local dialable area in which the service provider wishes to provide service and corresponding local telephone numbers to subscribers. Additionally, to provide redundancy and ensure service for subscribers within local regions, the service provider may establish two or more local controllers within a region. Furthermore, while two central servers and two 1-800 networks are shown, the service providers may employ more central servers and 1-800 networks, or employ only a single central server and 1-800 network (although this configuration will not provide robust call rerouting if a failure arises).

Under one embodiment using two 1-800 networks, if a failure arises in the first 1-800 network 112, the 1-800 network will automatically route the call from one switch to another. The service provider may provide permanent instructions to the 1-800 service provider to indicate a particular routing to be performed based on a fault, or based on 1-800 calls to the central servers, such as routing based on time of day, day of week, calling number, etc. Indeed, some long distance companies may permit the service provider to change routing instructions from one minute to the next, so that if one of the central servers is busy, calls are routed to the other central server.

Under an alternative embodiment, the local servers may perform such automatic switching by dialing the 1-800 number associated with the second 1-800 network 126. Indeed, in one embodiment, each central server employs a separate 1-800 number from each of the 1-800 networks 112 and 126. Thus, the local servers may automatically and intelligently route calls to either of the central servers over either of the 1-800 networks. Such automatic 1-800 call routing may be done for a variety of reasons. First, such 1-800 call routing may be done to correct or overcome failures within one of the 1-800 networks (or central servers). Thus, the service provider need not rely on failure prevention and rerouting techniques of the 1-800 network, but instead, may automatically swap between 1-800 carriers upon a failure. A central server may provide an error message or other signal to a local controller instructing the local controller to route calls to an alternate or second central server or over a second 1-800 network. Alternatively or additionally, the local controller may fail to connect a call with the central server or fail to receive an acknowledgement message, and in response thereto, automatically initiate a call to a second central server, over a second 1-800 network, or both.

Second, the service providers may quickly switch between 1-800 networks to route calls over the 1-800 network (and associated service provider) that provides the best or lowest cost service. Indeed, the service provider may negotiate calls to its 1-800 numbers (associated with its central servers) as a commodity on a periodic basis. For example, the service provider may determine the number and duration of calls placed to one or more of the central servers within the last hour. The service provider may then provide this information to the two or more 1-800 network service providers for bids, select the 1-800 service provider offering the lowest per-call price, and then have all local servers automatically switch to using the new 1-800 service provider. Such a negotiated transaction may be performed entirely electronically between the service provider and the 1-800 service providers (e.g., by email). Furthermore, the service provider may perform an electronic auction beforehand to identify the lowest 1-800 network service provider bid. In summary, aspects of the invention may provide dynamic cost savings so that the lowest 1-800 service rates are obtained on a periodic basis (even as frequently as hourly or less). Furthermore, the service provider may negotiate low rates for calls to its 1-800 numbers based on other criteria, such as on a route-by-route basis.

As noted above, switching calls between 1-800 networks is done electronically. One or more responsible organizations (e.g. at the LEC level) are required to assign and reassign the appropriate long distance carrier for a particular 1-800 number. The responsible organization employs a database that assigns long distance carriers to each 1-800 number. Thus, the 1-800 numbers may be associated with or fixed for the central servers, and changes to the long distance carrier that provides 1-800 number service for a particular 1-800 number may be performed quickly and automatically. Of course, different 1-800 numbers may be assigned to the central servers at any time, and such numbers stored in the local servers. Subscribers and callers do not have access to such 1-800 numbers, and thus, changes to 1-800 numbers is transparent and irrelevant to them.

A third benefit to employing two or more 1-800 networks is that the service organization can perform quality measurements to determine the number of calls per hour that a 1-800 network may provide before failure (or obtain other quality metrics). This quality measurement information may be used in marketing materials provided by the service provider that are sold to third party organizations or to the 1-800 networks service providers themselves.

Fourth, less redundancy is required under the system of FIG. 1: two central servers provide sufficient redundancy, together with the several available 1-800 networks provided by the 1-800 carriers, to provide sufficient safeguards for the service provider. This results in less cost to the service provider, since it need not purchase numerous expensive telecommunication servers and other equipment, and need not lease numerous T-3 trunks. Effectively, the 1-800 network operates as a virtual trunk. The system of FIG. 1 provides dynamic load balancing: each local controller may be controlled by at least one of the central servers to indicate to which central server calls are to be forwarded. For example, the local Baltimore controller 130 may be instructed by the New York central server 122 to route one in four calls to the Seattle central server 114. As the New York central server receives increased call traffic, it provides an instruction to the Baltimore local controller to now route three out of every four calls to the Seattle central server. Of course, various other ratios of routing calls between the central servers may be employed. Furthermore, various other methods of load balancing may be employed, as those skilled in the relevant art will appreciate.

Under one alternative embodiment, capabilities provided by the local controller are employed, such as telecommunications service capabilities provided by Dialogic or similar computer telephony cards, and thus do not require services of the central servers or require the need to place one or more 1-800 calls. Telecommunications services provided by the local controllers include replaying voice scripts or messages, receiving and storing voice messages, sending messages to a subscriber's computer, performing basic DTMF-based interaction with the caller, etc.

Each local controller then provides generic voice scripts to be replayed to all callers, such as "If you want to leave a message for this subscriber, please press 1, if you wish to send a fax to this subscriber, please press 2 . . . " Then, if a caller wishes to simply leave a voice message for the subscriber, the local controller recognizes this request from caller input, simply replays a voice script or outgoing greeting (possibly a personalized script by the subscriber that is stored at the local controller), and receives and stores a voice message from the caller. The voice message may then be forwarded to the central server at some later time over less expensive network connections, including one or more messages sent over the Internet. More expensive switching and call processing functions are then reserved for the central servers, such as voice recognition, text-to-speech conversion, speech-to-text conversion, database query and updating of subscriber profiles, etc. As a result, more and simpler telecommunication services provided by the service provider are moved to the edges of the network at the local controllers.

Under this alternative embodiment, certain subscribers may create virtual corporate front-ends to their call processing platforms. Local calls are handled at the local controllers, where callers go through a series of audible menus to access particular services they desire. The local controllers only make a 1-800 call to the central server when a caller requests a service that may only be handled by the central server. For example, if an airline carrier is a customer of the service provider, the airline carrier provides a series of menus (stored at each local controller) to allow callers to access arrival and departure times, reservation agents for domestic flights, reservation agents for international flights, mileage plan representatives, customer service representatives, specific individuals within the airline organization, etc. The local controller provides the series of menus in response to each incoming call from callers, and receives caller input or responses to these menus, typically in the form of DTMF or a push-button input.

If the caller wishes, for example, to be routed to a domestic reservations agent, the local controller places a call to a particular 1-800 number of the airline established for a domestic reservation call processing department staffed with agents to handle such calls. Calls to other agents or other numbers have other associated 1-800 numbers that the local controller may make. However, if the caller wishes, for example, to access a particular employee within the airline, then the local controller places a 1-800 call to the central server, which in turn routes the call to the particular airline employee. Alternatively, if the caller wishes to employ more expensive call processing features, such as voice recognition, the local controller similarly places a 1-800 call to the central server. Thus, inexpensive, more simply handled call processing is performed by the local controller, and 1-800 calls are only placed to the central server for more complex call processing.

Figure 4:
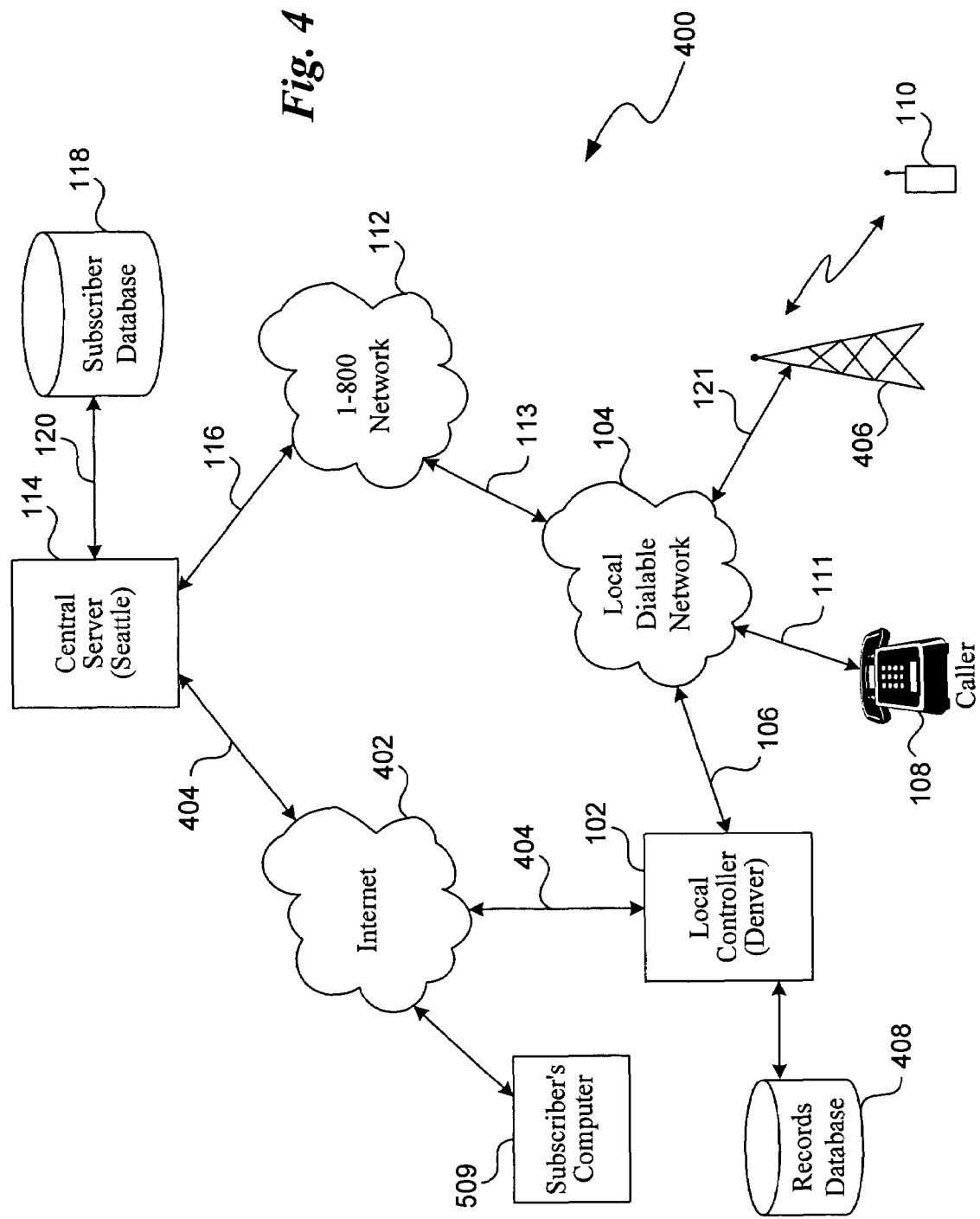
FIG. 4 is a network diagram illustrating an alternative embodiment to the system of FIG. 1.

Referring to FIG. 3, an example of a 1-800 number record, as stored at the local Denver controller 102, or stored elsewhere but accessible by the local Denver controller via a data network, is shown. The local controller includes, or has access to, a database for storing the record 300 (and other records and data), which is shown in FIG. 4. The 1-800 number record includes a Seattle central server 1-800 number field 302 and associated 1-800 number. Likewise, the record includes a New York City central server 1-800 number field 304 and associated 1-800 number. A flag (not shown) associated with either field 302 or 304 indicates which 1-800 number is the primary number that the local Denver controller should use to route calls to one of the two central servers.

For the above example, fields 306–316 correspond to the airline's domestic reservations 1-800 number, international reservations 1-800 number, customer service 1-800 number, mileage plan 1-800 number, airfreight 1-800 number, and baggage service 1-800 number fields, and associated 1-800 numbers. The record 300 also includes the airline's 1-800 number field 318 and associated number.

When the caller 108 dials the airline's 1-800 number (associated with field 318), the local dialable network 104 routes the call to the Denver local controller which in turn, retrieves the record 300, together with a voice script associated with the airline's 1-800 number to replay to the caller. Each of the fields 306–316 is associated with menu options in outgoing voice scripts presented to callers by the local Denver controller 102. For example, such voice scripts may indicate to each caller the following: "Thank you for calling Acme Airlines. Press 1 if you would like to speak to a domestic reservations agent; press 2 if you would like to speak to an international reservations agent; press 3 if you would like to speak to a customer service representative; press 4 if you would like to speak to a mileage plan representative; press 5 if you would like to speak to an airfreight agent; press 6 if you would like to speak to a baggage service representative; and press 7 if you would like to speak to an operator or a particular individual at Acme Airlines." If the caller presses 1 through 6, the local controller accesses the appropriate 1-800 number stored in fields 306–316, respectively, and places a 1-800 call over the 1-800 network 112 based on the retrieved number in the associated field. In other words, the local controller translates the received 1-800 number and the caller's menu choice into an associated 1-800 number (from fields 306–316). If the caller presses 7, then the local controller retrieves the airline's 1-800 number from field 318 and places a call to the airline over the 1-800 network using this number. Alternatively, if the user presses 7, the local controller routes the call to the Seattle central server 114 via a 1-800 call over the 1-800 network 112. Of course, while a single record is shown in FIG. 3, the local controller may well store separate records for each corporate or large subscriber that has multiple 1-800 numbers. Each of such records may be keyed to the large subscriber's 1-800 number (field 318) in the database associated with the local controller.

Under another alternative embodiment, inexpensive network messages are first transmitted or exchanged before placing any 1-800 or long distance calls. For example, with each incoming call, the local controller sends a data or query message to the central server, such as an IP message over the Internet. The query message asks the central server, for example, to locate the subscriber. If the central server responds with another IP message indicating that the subscriber is found, then the local controller places a 1-800 call to the central server to route the incoming call. However, if the subscriber cannot be found, then the local controller simply takes a voice mail message. Thus, the local controller never makes a 1-800 call, thereby saving the cost for such a call and not further taxing the resources of the central server. Processing of such calls is again distributed to the local controllers.

In the example above, the central server may attempt to locate the subscriber, for example, by dialing the subscriber's current phone number directly. Alternatively, the central server may attempt to locate the subscriber by sending another IP message to a second local controller and asking the second local controller to attempt to dial the subscriber's current phone number, and then respond to the central server if the call is completed. In this example, if the call is successfully connected to the subscriber, then the first local controller with the incoming call will be instructed to place a call to the second local controller with the outgoing call, and the incoming and outgoing call will be connected together.

Furthermore, the local controllers may employ automated messaging to subscribers, such as IP messaging to a subscriber's computer. For example, with each incoming call, the local controller sends an alert message to the subscriber's currently registered computer to alert the subscriber that an incoming call has been received. The subscriber may then dispose of the call using a graphical user interface or other means on the subscriber's computer. For example, the subscriber may depress a button on the subscriber's computer to send a signal back to the local controller to request that the incoming call be sent to voicemail, forwarded to the subscriber's cell phone, routed to the transcriber's secretary, etc.

The term "currently registered computer" refers to a computer that the subscriber has indicated as being the computer to which messages are currently to be sent. For example, the subscriber may employ a wireless palmtop computer to which the subscriber wishes incoming call indication messages to be forwarded. The subscriber notifies the local controller (or the central server, which in turn notifies the local controller) of the IP address, Uniform Resource Locator ("URL"), email address or other address for the palmtop computer. Alternatively, the subscriber may establish a schedule for how such messages are to be forwarded, such as from 9 a.m. to 5 p.m. messages are to be sent to the address associated with the subscriber's desktop computer at the subscriber's business, and otherwise sent to the address associated with the subscriber's home computer. Further details regarding such IP messaging may be found in the assignee's U.S. provisional patent application No. 60/235, 989, entitled Telephone Call Handling System and Method, such as a call screening system employing standard contract management software, filed Sep. 28, 2000. Note that the term "subscriber," as generally used herein, refers not only to an individual who subscribes to a telecommunication service, but to any individual, organization or object that places or receives a call. Furthermore, a "call" generally refers to not only a verbal audio signal provided or exchanged, but also a data signal. Thus, aspects of the invention are equally applicable to data transmissions between two or more geographically separate computers.

Referring to FIG. 4, an example of a network system 400 for implementing aspects of the above embodiments is shown. The system 400 is similar to the network system of FIG. 1, and may include additional components that are not shown in FIG. 4. The Internet 402, connecting the local Denver controller 102 and Seattle central server 114 by links 404, carries message traffic between the controller and server. For example, when the caller places a call to the subscriber, the local Denver controller, upon receiving the call, sends an electronic message via the Internet to the Seattle central server. In one embodiment, the message is in the common Transmission Control Protocol/Internet Protocol ("TCP/IP") format (at the network, transport and session layers), and may be encoded under any known application protocol (such as the HyperText Transfer Protocol (HTTP), Simple Message Transfer Protocol (SMTP), Post Office Protocol (e.g. "POP3"), etc.).

The message sent by the local Denver controller to the Seattle central server may simply include only the dialed number (the subscriber's number), but may also include other information, such as the caller's number. In response thereto, the Seattle central server retrieves the appropriate profile from the subscriber database 118 based on the dialed (subscriber's) number. If, for example, the subscriber's profile indicates that all calls are to be routed to voicemail, the Seattle central server sends an appropriate message back to the local Denver controller via the Internet. In response thereto, the local Denver controller may replay an outgoing voice greeting previously stored by the subscriber and receive and store a voice message from the caller.

Alternatively, the subscriber's profile may indicate that the subscriber wishes to be called on his or her mobile phone, in which case, the server sends an appropriate electronic message via the Internet to the local controller, where the message may include the subscriber's cell phone number and any other relevant information (such as location, network, etc.). In response thereto, the local controller may initiate a call with a local dialable network to route the call to the subscriber's mobile phone 110 via a cellular network 406. Of course, the local Denver controller may include a records database 408 that locally stores locally the subscriber's profile, as well as other records. If the subscriber's profile is stored locally, the local Denver controller may need only to exchange electronic messages via the Internet to determine if the subscriber has made any recent changes to his or her profile as stored centrally at the subscriber database 118.

Referring to FIG. 5, an example of a subscriber record, such as may be stored in the records database 408, is shown as a record 500. The record may include optional fields indicating the 1-800 numbers for the Seattle and/or New York central servers, with a flag indicating which 1-800 number (and therefore which central server) the local controller is to employ with respect to that particular subscriber. The record may also include network addresses for the Seattle and New York central servers in fields 502 and 504, respectively (shown as "Seattle@accessline.com" and "NYC@accessline.com", respectively). Of course, the 1-800 numbers and addresses of the central servers may be stored in one or more separate records and not form part of each subscriber's record.

The subscriber record 500 also includes a subscriber's outgoing voice greeting field 506, which may be a .wav file that stores a personal audio greeting to be replayed to callers. Of course, various other formats may be employed for recording and storing audible data besides .wav format. Fields 508 and 510 respectively store the subscriber's primary and secondary network addresses, shown as "subscriber@AcmeInc.com" and "subscsriber@ISPinc.com", respectively. If the subscriber has indicated in his or her profile that he or she wishes to be contacted at his or her computer, then the local controller sends an appropriate TCP/IP message to the subscriber's primary address (the currently registered computer). For example, the primary address may correspond to the subscriber's office desktop computer 509 (shown in FIG. 4). Alternatively, the subscriber's profile may indicate that at certain times or occasions, the local controller is to send a TCP/IP message to the subscriber's secondary address (field 510), which may be a wireless palmtop computer or web enabled cell phone. Either way, the local controller provides an electronic notification to the subscriber of an incoming call. The notification may further permit the subscriber to determine how to dispose of the incoming call (such as routing it to the subscriber's cell phone, sending the call to voicemail, etc.). The network controller may employ the subscriber's secondary address (field 510) if, for example, a connection could not be established at the subscriber's primary address, or for other reasons.

The subscriber record 500 may include numerous additional fields. For example, fields 512–516 represent stored voice messages received and stored by the local Denver controller in the records database 408 with respect to three received and stored voice messages from callers. During lulls in network traffic, and the like, the local controller may, in batch processing, transmit such stored voice messages to the Seattle central server via the Internet (and may compress such files before transmission).

Under other alternative embodiments, in addition to, or alternative with, the 1-800 network, the system may employ one or more voice-over IP networks. Alternatively, or additionally, the service provider may negotiate a substantially inexpensive long distance rate with a long distance carrier, where the long distance rate is equal to or less than rates for 1-800 calls. Thus, the server provider may employ a long distance network in lieu of, or in addition to, one or more 1-800 networks.

An alternative embodiment locates the local controllers at a number of customer premise locations, for example connected to the Private Branch Exchange ("PBX") at each office location of a large corporation. In this embodiment, the local controllers are used to route calls via 1-800 networks to one or more central servers to provide a service of the service provider, for example voice messaging. In this embodiment, one skilled in the art can understand how the local controllers may also be used to implement a Virtual Private Network for the large corporation, allowing calls between the corporate offices to be placed as 1-800 calls between the local controllers.

Figure 6:
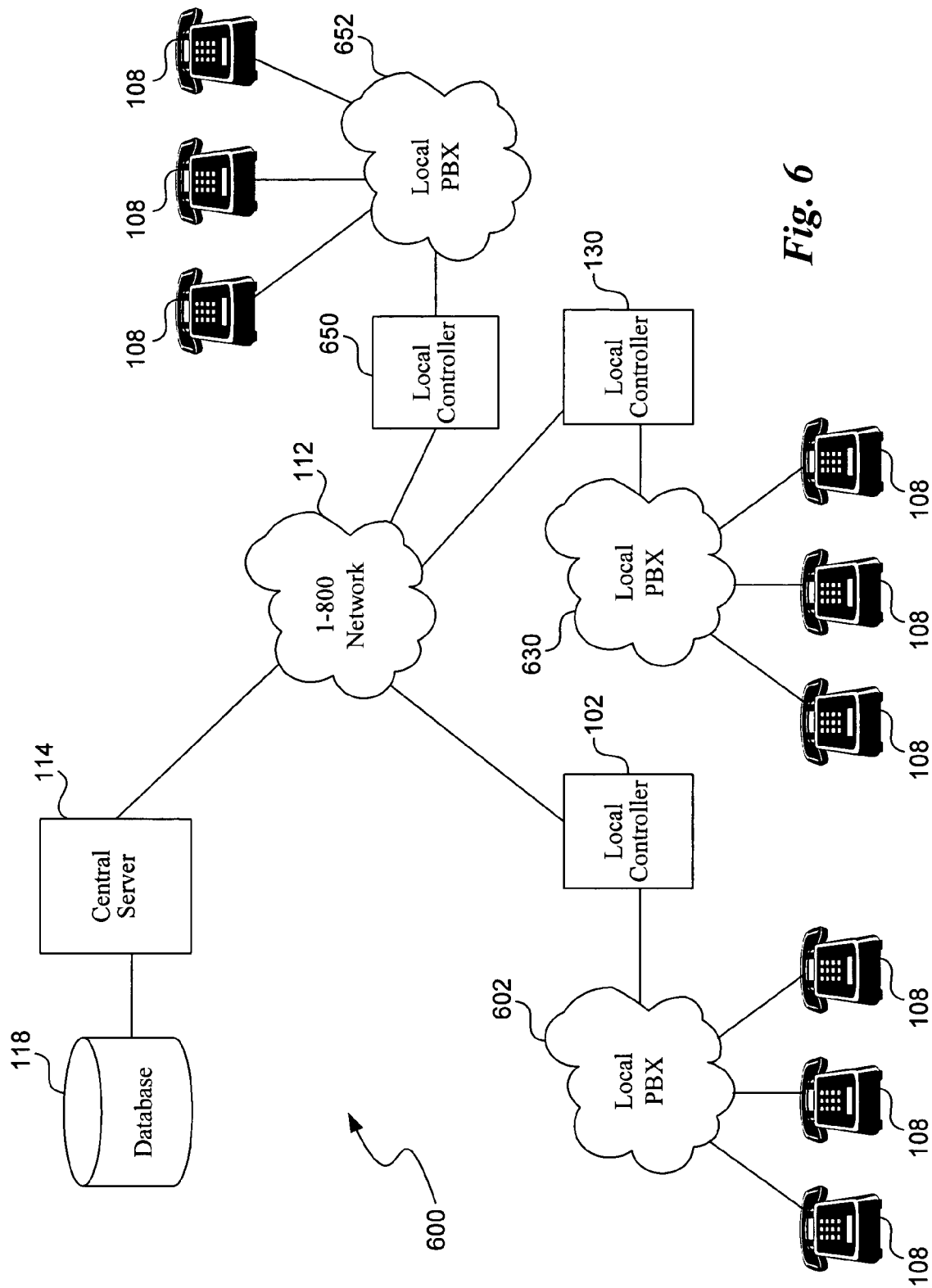
FIG. 6 is a network diagram illustrating another alternative embodiment of the system of FIG. 1.

Referring to FIG. 6, an example of this alternative embodiment is shown where three local controllers 102, 130 and 650 are each coupled locally to a separate local PBX 602, 630 and 652, respectively. Each of the local PBXs may be located in different geographic regions associated with different offices of a company, such as at offices located in Denver, Baltimore, and New Orleans. Each local caller has a 1-800 number associated with it. The local controllers employ the methods described herein to route calls from local callers at each PBX to individuals at any other PBX using 1-800 calls over the 1-800 network. Thus, if one caller associated with the local PBX 602 wishes to call another caller associated with the local PBX 652, the local controller 102 places a 1-800 call to the local controller 650 using the 1-800 number associated with the local controller 650. Thus, the corporation may tie each local PBX system together and permit all callers within a company to exchange calls as if they were local calls, and only inexpensive 1-800 rates would be incurred for calls between PBX systems.

Furthermore, the system 600 may be connected with a central server to provide additional functionality. For example, the central server 114 may provide enhanced telecommunication services, as described herein. The central server may be owned and operated by the corporation, or the corporation may contract such enhanced services and functionality out to a third party telecommunication service provider.

Importantly, while 1-800 networks are generally shown and described herein, the invention is equally applicable to any system employing local controllers to make dialable calls the central controllers over the public-switched telephone network ("PSTN"). In other words, the invention is equally applicable to calls made by local controllers over any dial-up network, such as long-distance calls made by local controllers using any long-distance telecommunications service provider. Thus, under an alternative embodiment, at least one of the 1-800 networks is replaced by a long-distance network, and 800 numbers are replaced with corresponding long-distance numbers (e.g., a ten-digit dialable number). The service provider may then negotiate inexpensive or attractive rates or agreements with one or more long-distance service providers to accept such calls from local controllers to central servers (and vice versa).

In general, caller or subscriber input described herein may be of any form, not necessarily DTMF input or voice command (e.g., under IVR). For example, subscriber or user input may be point-and-click or keyboard interaction with a web page using a computer input device, personal computer and web browser software; may be of a graphical form (e.g., bitmapped, vector-based or matrix); or may be provided to the user via an appropriate device, such as a palm top computer having a wireless connection to the system.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other communication routing systems, not only the telephone call routing system with 1-800 networks described in detail above. The elements and acts of the various embodiments described above can be combined to provide further embodiments.

Features of the invention described herein may be modified in light of the present assignee's pending patent applications entitled "Dynamic Security System and Method, Such as for Use in a Telecommunication System", and "System and Method for Universal Access of Voice Messages" filed Jun. 26, 2000 and Aug. 7, 2000, having application Ser. Nos. 09/604,283 and 60/223,160, all respectively, to provide yet further embodiments of the invention.

All of the above references and U.S. Patents and applications are incorporated herein by reference. Aspects of the invention can be modified, if necessary, to employ the systems, functions and concepts of the various references, patents and applications cited above to provide yet further embodiments of the invention. These and other changes can be made to the invention in light of the above detailed description.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole, and not to any particular portions of this application.

These and other changes can be made to the invention in light of the above detailed description. In general, in the following claims, the terms used should not be construed to limit the invention to the specific embodiments disclosed in the specification and the claims, but should be construed to include all telecommunications systems that operate under the claims to provide inexpensive call routing. Accordingly, the invention is not limited by the disclosure, but instead, the scope of the invention is to be determined entirely by the claims.

While certain aspects of the invention are presented below in certain claim forms, the inventors contemplate the various aspects of the invention in any number of claim forms. For example, while only one aspect of the invention is recited as a computer-implemented method, that aspect may be embodied in a computer-readable medium, and other aspects may likewise be embodied as a computer-implemented method or in a computer-readable medium. Accordingly, the inventors reserve the right to add additional claims after filing the application to pursue such additional claim forms for other aspects of the invention.

We claim:

1. A computer-implemented method for routing calls from at least one caller to a subscriber of telecommunications services, wherein at least one call from the caller is routed from a local telecommunications network to a distant central telecommunications server, wherein the local telecommunications network includes a local dialable network that differs from a local dialable network to which the central telecommunications server is associated, the method comprising:
   at a local controller coupled to and associated with the local telecommunications network, receiving from the local telecommunications network an incoming call from a calling number associated with a caller, to a called number associated with the subscriber;
   at the local controller, locally storing at least the called number associated with the caller;
   at the local controller, initiating a 1-800 call to the central telecommunications server over a 1-800 network via the local telecommunications network;
   at the local controller, transferring the called number to the central telecommunications server via the 1-800 call over the 1-800 network;
   at the central telecommunications server, receiving the calling and called numbers and retrieving a subscriber profile based on the called number, wherein the subscriber profile is associated with the subscriber and identifies subscriber defined call routing preferences;
   at the central telecommunications server, receiving the incoming call; and
   at the central telecommunications server, routing the incoming call based on at least one subscriber defined call routing preference in the retrieved subscriber profile.

2. The method of claim 1 wherein locally storing includes storing the calling number, wherein transferring the called number includes transferring to the central telecommunications server the called and calling numbers in available ISDN fields in the 1-800 call, and wherein the method further comprises:
   at the central telecommunications server, providing a confirmation message to the local controller, wherein the confirmation message is provided over the Internet;
   at the central telecommunications server, providing the incoming call to the local controller;
   at the local controller, placing a local call over the local dialable network to the subscriber; and
   at the local controller, connecting the incoming call with the local call.

3. The method of claim 1 wherein the central telecommunications server and local controller are coupled to a second 1-800 network, and wherein the method further comprises:
   at the central telecommunications server, providing a first error message to the local controller;
   at the local controller, providing the dialing number to the central telecommunications server as in-band signaling in response to the first error message;

at the central telecommunications server, providing a
second error message to the local controller;
at the local controller, initiating another 1-800 call to the
central telecommunications server over the second
1-800 network in response to the second error message;
at the central telecommunications server, providing the
incoming call to one of a plurality of local controllers;
at the one local controller, placing a local call to the
subscriber; and
at the one local controller, connecting the incoming call
with the local call.

4. An apparatus for routing calls for a subscriber from a
local telecommunications network to a distant central telecommunications server, the apparatus comprising:
a memory,
a computer coupled to the memory;
a telecommunications call handling subsystem coupled
between the local telecommunications network and the
computer, wherein the computer and call handling
subsystem are configured to:
receive a call from a first number to a second number
associated with the subscriber; store in the memory
at least the second number; initiate a 1-800 call to the
central telecommunications server over a 1-800 network via the local telecommunications network; and
transfer at least the second number to the central
telecommunications server via the 1-800 call over
the 1-800 network; and
wherein transferring at least the second number includes
transferring to the central telecommunications server
the called and calling numbers in ISDN fields in the
1-800 call, and wherein the computer and call handling
subsystem are further configured to:
provide the second number to the central telecommunications server as in-band signaling in response to a
first error message received from the central telecommunications server;
initiate another 1-800 call to the central telecommunications server over a second 1-800 network in
response to a second error message received from the
central telecommunications server; and
connect the call with the 1-800 call in response to an
acknowledgement message received from the central
telecommunications server.

5. The apparatus of claim 4 wherein the computer and call
handling subsystem are further configured to:
receive a routing message from the central telecommunications server;
place a local call over the local dialable network to the
subscriber based on the received routing message; and
connect the call with the local call.

6. The apparatus of claim 4 wherein the computer is
further coupled to the Internet, and wherein the computer
and the call handling subsystem are further configured to:
provide a first message over the Internet to the central
telecommunications server, wherein the first message is
provided in response to the call;
receiving a second message over the Internet, from central
telecommunications server.

7. The apparatus of claim 4 wherein transferring at least
the second number includes transferring to the central telecommunications server the calling number as DTMF signaling.

8. The apparatus of claim 4 wherein transferring at least
the second number includes transferring to the central telecommunications server the called number in an available
ISDN field in the 1-800 call.

9. The apparatus of claim 4 wherein the apparatus is
coupled to a second 1-800 network, and wherein the computer and call handling subsystem are further configured to:
initiate a 1-800 call to the central telecommunications
server over the second 1-800 network in response to a
message received from the central telecommunications
server.

10. The apparatus of claim 4 wherein the apparatus is
coupled to a second 1-800 network and a second central
telecommunications server, and wherein the computer and
call handling subsystem are further configured to:
initiate a 1-800 call to the second central telecommunications server over the second 1-800 network in
response to a switch message or lack of an acknowledgment message from the central telecommunications
server.

11. The apparatus of claim 4 wherein the computer and
call handling subsystem are further configured to:
provide voice scripts to the received call; and
receive and store in the memory a voice message.

12. The apparatus of claim 4 wherein the computer and
call handling subsystem are further configured to:
receive and store in the memory a voice message based on
the call; and
forward to the central telecommunications server the
stored voice message.

13. An apparatus for routing calls for a subscriber from a
local telecommunications network to a distant central telecommunications server, the apparatus comprising:
a memory,
a computer coupled to the memory;
a telecommunications call handling subsystem coupled
between the local telecommunications network and the
computer, wherein the computer and call handling
subsystem are configured to:
receive a call from a first number to a second number
associated with the subscriber; store in the memory
at least the second number; initiate a 1-800 call to the
central telecommunications server over a 1-800 network via the local telecommunications network; and
transfer at least the second number to the central
telecommunications server via the 1-800 call over
the 1-800 network; and
wherein a caller places the call from the first number, and
wherein the computer and call handling subsystem are
further configured to:
provide voice scripts to the caller;
initiate the 1-800 call to a first 1-800 number based on
a first input signal received from the caller; and
initiate another 1-800 call to another 1-800 number
based on a second input signal received from the
caller.

14. The apparatus of claim 13 wherein the computer and
call handling subsystem are coupled to the Internet and are
further configured to:
provide an alert message to the subscriber over the
Internet based on the received called; and
receive a call disposition message from the subscriber that
indicates how the received call is to be routed.

15. The apparatus of claim 13 wherein transferring at least
the second number includes transferring to the central telecommunications server the called number in an in-band
signal associated with the 1-800 call.

16. The apparatus of claim 13 wherein transferring at least
the second number includes transferring to the central telecommunications server the called number in an out-of-band signal associated with the 1-800 call during set up of the 1-800 call.

17. The apparatus of claim 13 wherein the computer is coupled to a computer network, and wherein transferring at least the second number includes transferring to the central telecommunications server over the computer network the called number in an Internet Protocol (IP) message.

18. The apparatus for routing calls for a subscriber from a local telecommunications network to a distant central telecommunications server, the apparatus comprising:
 a memory,
 a computer coupled to the memory;
 a telecommunications call handling subsystem coupled between the local telecommunications network and the computer, wherein the computer and call handling subsystem are configured to:
  receive a call from a first number to a second number associated with the subscriber; store in the memory at least the second number; initiate a 1-800 call to the central telecommunications server over a 1-800 network via the local telecommunications network; and transfer at least the second number to the central telecommunications server via the 1-800 call over the 1-800 network; and
 wherein the computer and call handling subsystem are further configured to:
  receive a routing message from the central telecommunications server;
  place another 1-800 call to another apparatus based on the received routing message, wherein the another apparatus is substantially similar to the apparatus; and
  connect the call with the another 1-800 call.

19. An apparatus for routing calls for a subscriber from a local controller coupled to a local telecommunications network, the apparatus comprising
 a memory,
 a computer coupled to the memory,
 a telecommunications call handling subsystem coupled between a 1-800 network and the computer, wherein the computer and call handling subsystem are configured to:
 receive a 1-800 call over a 1-800 network from the local controller based on a call received by the local controller from a first number to a second number associated with the subscriber; receive the first and second numbers from the local controller via the 1-800 call over the 1-800 network; and determine routing of the call based on the received first and second numbers; and
 wherein the telecommunications call handling subsystem is coupled to a second 1-800 network, and wherein the computer and call handling subsystem are further configured to instruct the local controller to place at least some 1-800 calls over the second 1-800 network.

20. The apparatus of claim 19 wherein the computer gathers metrics based on calls received from the 1-800 network.

21. The apparatus of claim 19 computer and call handling subsystem are coupled to the Internet and are further configured to:
 provide a locator message to another local controller over the Internet, based on the call received by the local controller; and
 receive an indication message over the Internet from the another local controller of whether the subscriber is within a local telecommunications network associated with the another local controller.

* * * * *

UNITED STATES PATENT AND TRADEMARK OFFICE
CERTIFICATE OF CORRECTION

PATENT NO. : 7,068,772 B1  Page 1 of 1
APPLICATION NO. : 10/911213
DATED : June 27, 2006
INVENTOR(S) : Widger et al.

It is certified that error appears in the above-identified patent and that said Letters Patent is hereby corrected as shown below:

Column 4
Line 26, "http://www.lucent-ssq.com/ons/exs/" should be
--http://www.lucent-ssg.com/ons/exs/.--;

Signed and Sealed this

Seventh Day of November, 2006

JON W. DUDAS
*Director of the United States Patent and Trademark Office*